United States Patent [19]

Hecq

[11] Patent Number: 4,882,214

[45] Date of Patent: Nov. 21, 1989

[54] MATTED GLASS

[75] Inventor: André Hecq, Nalinnes, Belgium

[73] Assignee: Glaverbel, Brussels, Belgium

[21] Appl. No.: 35,266

[22] Filed: Apr. 6, 1987

[30] Foreign Application Priority Data

Apr. 8, 1986 [GB] United Kingdom ............... 8606496

[51] Int. Cl.$^4$ ..................... C03C 15/02; H01J 29/24
[52] U.S. Cl. ................................ 428/141; 428/426; 428/703
[58] Field of Search ................ 428/141, 426, 703, 34, 428/913.3, 918, 908

[56] References Cited

U.S. PATENT DOCUMENTS

| | | | |
|---|---|---|---|
| 937,550 | 10/1909 | Rembusch | 428/141 |
| 1,694,706 | 12/1928 | Herz | 428/141 |
| 2,401,537 | 6/1946 | Adams | 428/141 X |
| 2,697,893 | 12/1954 | Schaum | 428/141 |

FOREIGN PATENT DOCUMENTS

| | | |
|---|---|---|
| 0106301 | 10/1983 | European Pat. Off. |
| 551460 | 2/1943 | United Kingdom . |
| 747738 | 4/1956 | United Kingdom . |
| 878594 | 11/1959 | United Kingdom . |
| 876861 | 9/1961 | United Kingdom . |
| 883663 | 12/1961 | United Kingdom . |
| 042969 | 11/1963 | United Kingdom . |
| 1019415 | 12/1963 | United Kingdom . |
| 1091823 | 2/1966 | United Kingdom . |
| 1151931 | 7/1966 | United Kingdom . |
| 183447 | 8/1968 | United Kingdom . |
| 1246193 | 12/1969 | United Kingdom . |
| 1290863 | 7/1970 | United Kingdom . |
| 2102786 | 7/1981 | United Kingdom . |

Primary Examiner—Nancy A. B. Swisher
Attorney, Agent, or Firm—Spencer & Frank

[57] ABSTRACT

Light transmitting glass has at least one surface area which is matted by surface pits. That surface area has a population of merging or contiguous surface pits, the pits being of such small area and profile that clearly legible typed characters of 10-pitch size are still clearly legible when viewed through such matted surface area when that surface is held at a distance of 10 cm from the said characters. At least one matted surface area may be occupied by a population of surface pits which are of such small size that a disk having a diameter of 10 micrometer cannot be placed thereon without overlapping at least two pits. In order to produce such glass, the surface area is etched with a solution of a salt of hydrofluoric acid to leave a substantially contiguous population of fluorine-containing crystals, those crystals are removed to leave the surface area with a population of merging or contiguous surface pits, and the resulting pitted surface area is treated to remove a superficial stratum therefrom in order to leave the surface area occupied by a population of merging or contiguous surface pits which are of such small size that a disk having a diameter of 10 micrometer cannot be placed thereon without overlapping at least two pits. The preferred etching medium is aqueous potassium bifluoride, and the superficial stratum removal is preferably effected by chemical polishing, e.g., using a solution containing hydrofluoric acid.

14 Claims, 2 Drawing Sheets

100 μm

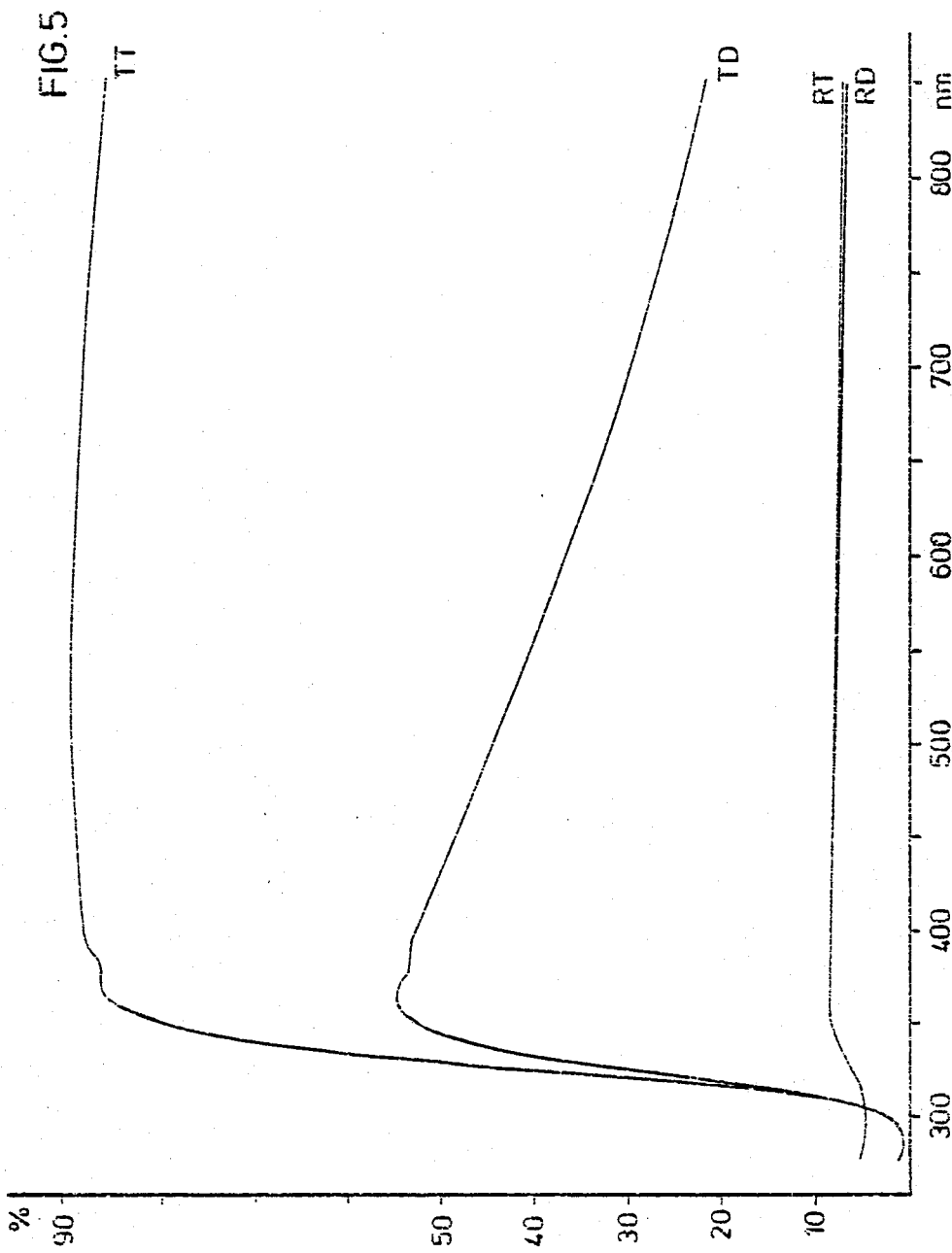

MATTED GLASS

BACKGROUND OF THE INVENTION

1. Field of the Invention

This invention relates to a piece of light transmitting glass having at least one surface area which is matted by surface pits. The invention also relates to a process of producing matted glass comprising forming a surface area of a piece of glass with a population of surface pits.

2. Description of the Related Art

It is well known that light is reflected at the boundary between two media having different refractive indices. Assuming that the media are thick enough that interference effects can be ignored, the amount of normally incident light which will be reflected will be approximately $[(n_1-n_2)/(n_1+n_2)]^2$, where $n_1$ and $n_2$ are respectively the refractive indices of the two media. In the case of a glass/air interface, we can write $n_1 \simeq 1.5$ and $n_2 \simeq 1$, and the expression thus indicates that about 4% of light incident on any glass/air interface will be reflected at that interface, and about 8% will be reflected from the two surfaces of a glass sheet in air.

This reflection is a disadvantage for many purposes. As examples may be cited: instrument dial glasses, for example watch glasses; glass panels covering light emitting diode displays, and more particularly those covering liquid crystal displays; cathode ray tube screens, for example television screens and computer monitor screens; and sheets of glass held in picture frames to protect a photograph, painting or drawing.

It is well known that the amount of light reflected from a glass sheet can be reduced by applying a surface coating of a material having a refractive index intermediate those of air and glass. By selecting the coating material to have a refractive index which is the geometric mean of the refractive indices of the two other media, in this case glass and air, the total amount of light reflected at the air/coating and coating/glass interfaces can be reduced to about 2%, and by selecting the thickness of the coating for interference extinction between the light reflected at the two interfaces, the amount reflected can be reduced even further. However such coatings are difficult and expensive to apply, and materials having the required refractive index are often softer than glass so that they may easily become abraded. Also some such coating materials are inherently coloured, and they can be detrimental to the performance of other coatings which may be required for other purposes.

Since it is the image of the light source on the glass which gives rise to problems in viewing through the glass, it has been proposed not so much to reduce the total amount of light reflected, as to reduce the proportion of reflected light which is reflected specularly. As an example, it is well known to etch the surface of glass so that its surface is matted, in that it is densely populated with pits which act to scatter surface-reflected light. As a result, a high proportion of that light is diffusely rather than specularly reflected. An example of a method of producing such glass is set forth in Glaverbel's British patent specification No. 1 151 931.

Such surface matting also affects light transmitted by the glass, and a proportion of the light transmitted through such a matted area will also be diffuse. This can be an important disadvantage if it is desired to view an object or image located some distance behind the glass surface, since the diffusely transmitted light will make optical resolution of the object or image difficult or impossible. For example it will be appreciated that television screens, especially in the larger sizes which are commercially available, may often be several centimeters thick and any matting treatment performed on the exterior surface of the screen will accordingly impair resolution of the image formed on the interior, coated face of the screen.

SUMMARY OF THE INVENTION

The present invention is based upon our discovery that by forming pits to an appropriate size and shape in the surface of a piece of glass, the glass can be rendered diffusely reflecting without thereby preventing clear optical resolution of an object or image through the glass in the case that the object or image is located some distance behind the glass surface. We have found that this combination of properties is achievable by forming the pits with a particular profile requirement, avoiding angular pits, and so that the pits are of very small area. The maximum permissible area is governed by the degree of resolution required, but it is in any event very much smaller than the areas of the pits formed in previously known matted glass.

According to the invention, there is provided a piece of light transmitting glass which is a flat sheet having at least one surface area which is matted by surface pits, characterised in that such surface area has a population of merging or contiguous surface pits, the pits being of such small area and profile that clearly legible typed characters of 10-pitch size are still clearly legible when viewed through such matted surface area when that surface is held at a distance of 10 cm from the said characters.

The benefits afforded by the present invention do not depend on the glass being in the form of a flat sheet, and accordingly, in a second aspect, the present invention provides a piece of light transmitting glass which is not a flat sheet and which has at least one surface area which is matted by surface pits, characterised in that such surface area has a population of merging or contiguous surface pits, the pits being of such small area and profile that clearly legible typed characters of 10-pitch size would still be clearly legible when viewed through an identically pitted surface area of a sheet of light transmitted flat glass when such surface of such flat glass sheet is held at a distance of 10 cm from the said characters.

It is extremely surprising that clear resolution of such typed characters should be possible through a matted glass surface located 10 cm in front of them. It would be expected that the light scattering which takes place due to the presence of surface pits in the glass would make such resolution impossible at much closer spacing between the glass and the type. For example, we have tested commercially available matted glass made in accordance with the teaching of British patent specification No. 1 151 931, and have found that the legibility of typescript decreases rapidly as the distance between the glass and typescript is increased, and at any distance more than about 3 cm, typescript of 10-pitch size is substantially illegible. The surprising and advantageous increase in resolvability through a matted surface area of a piece of glass in accordance with this invention is attributed to the small size of the surface pits, and to their profile, avoiding pits which are angular. As a result, glass in accordance with this invention may be used for any purpose for which previously known matted glass is suitable, except of course for those purposes where a lack of resolvability is actually desired as in some windows and interior partitions of buildings. Glass in accordance with this invention may also be used for other purposes, for example for facing display cabinets or for television screens, for which known matted glass is unsuitable because of the lack of resolution of objects spaced therefrom.

The shape of the pits has an important effect in achieving the required resolution when viewing an object through the glass. It has already been stated that angular pits are to be avoided, and advantageously at least the bottom portions of the pits are of rounded profile. This is in distinction to what would naturally be achieved simply by etching with hydrofluoric acid and washing off the resulting fluorosilicate crystals. That would leave a population of generally polyhedral pits reflecting the shape of the crystals formed. We have found it of importance that the pits should be of rounded profile at least in their bottom portions, so as to give a wide scattering angle of light diffused at the matted surface of the glass.

In preferred embodiments of the invention, at least one said matted surface area is occupied by a said population of surface pits which are of such small size that a disk having a diameter of 10 $\mu$m cannot be placed thereon without overlapping at least two pits. In the most preferred embodiments of the invention, at least one said matted surface area is occupied by said population of surface pits which are of such small size that a disk having a diameter of 5 $\mu$m cannot be placed thereon without overlapping at least two pits. In practice, these tests would be performed on photomicrographs, for example to a magnification of 1000 times. The provision of a dense population of surface pits of such small size ranges is one of the factors which have an important effect in achieving good resolution when viewing an object through the glass. We have found that the smaller are the pits, the less is the effect of increasing the distance between the glass and an object viewed through it on the ease with which details of the object can be resolved by a viewer.

With pits of such small size, we have found that the matted glass cannot be treated merely as a diffracting object in order to predict the extent of diffusion of light according to the classical laws of geometrical optics. For very small pits, it is not impossible that diffusion is governed by Rayleigh's equation for scattering by objects which are small in relation to the wavelengths of visible light according to which the intensity of the scattered light is proportional to the reciprocal of the fourth power of the wavelength ($\lambda$) of the light. It is however more likely that the intensity of the scattered light, is proportional to $\lambda^{-n}$ (Mie's equation) where n lies in the range 0 to 4, and in fact for a pit diameter of about 5 $\mu$m it appears that n≃1.5.

The depth of the pits is also of importance. Advantageously, at least one said matted surface area is occupied by a said population of surface pits, substantially all of which pits have a depth in the range 0.1 $\mu$m to 1.0 $\mu$m inclusive. This is found to promote resolvability through the glass without detracting from its diffuse light reflecting property, and is of particular value in glass facings for liquid crystal displays. We have found that pits of such depths have little or no appreciable effect in inhibiting the mobility of liquid crystals faced by such glass. The deeper pits associated with previously known matting techniques do have such an inhibiting effect on liquid crystal mobility. In the most preferred embodiments of the invention, at least one said matted surface area is occupied by said population of surface pits substantially all of which have a depth and diameter which are so related that the depth of a said pit divided by its diameter is at least 0.01, and optimally lies between 0.02 and 0.5 inclusive. This is beneficial for promoting a large quantity of light which is diffused at the said matted surface area.

In particularly preferred embodiments of the present invention, the angle of scatter of diffuse light transmitted by such matted surface area is at least 10°. A wide angle of scatter is of value in reducing the visible effect of light reflected by the matted surface area, and is of particular value in the construction of certain types of photo-voltaic cell.

Some photo-voltaic cells comprise a glass sheet on which are successively deposited, a transparent conductive layer, for example of doped tin oxide, a photo-active layer, for example based on amorphous silicon, and a second conductive layer which may be a reflective layer for example of aluminium. Clearly, the chance that any given photon will act to create an electron-hole pair within the photo-active layer will increase with the length of the light path through that layer. (This explains the preferred use of a reflecting rear conductive layer.) But increasing the physical thickness of the photo-active layer will increase the chance that a just-released electron will be trapped before it can reach one or other of the conductive layers. Also, in order to receive the greatest light intensity, such a cell must be aligned normally to the sun's radiation. By making the glass as a diffusing screen the effective length of the path of the diffused light within the photo-active layer can be increased without either displacing that layer from an orientation normal to solar radiation or increasing its actual thickness.

The use of glass having a matted surface area such as to transmit light diffusely with a large scattering angle is considered to be of great practical importance and it forms the subject of a copending patent application filed currently, Ser. No. 07/035,267 filed Apr. 6, 1987.

For some purposes, including use in a photo-voltaic cell, it is desirable that a large proportion of transmitted light should be transmitted diffusely. Accordingly, in some preferred embodiments of the invention, at least 30%, preferably at least 40% and optimally at least 50%, of the light which is transmitted through the glass over such matted surface area is transmitted diffusely. Alternatively, or in addition, it is preferable that at least 20%, preferably at least 30% and optimally at least 40%, of the light which is incident on the glass over such matted surface area is diffusely transmitted. That is of especial benefit when the glass is incorporated in a photo-voltaic cell as aforesaid, and enables an increase in conversion efficiency of up to 30% or even more to be achieved.

Preferably, at least 70% of the light which is reflected at such matted surface area is reflected diffusely. This is of benefit in reducing the perceptibility of such reflected light, thus improving the visibility of an object located behind the glass, especially when the object is illuminated, through the glass, by a spot-light.

In especially preferred embodiments of the invention, said typed characters are clearly legible when viewed through such matted surface area when the flat glass surface is held at a distance of 20 cm from the said characters. Matted glass which can satisfy this test is very useful for fronting display cabinets in which objects, for example objects of art and/or of historical interest, may be located some distance behind the glass, and in the most preferred embodiments of the invention, provided said typed characters are located at a distance from the eye of a reader at which those characters can be read clearly, the characters are clearly legible through said matted surface area of said piece of flat glass no matter where the glass is located between the characters and the reader's eye.

Advantageously, said characters are clearly legible when viewed through said matted surface area of said piece of flat glass when the glass is at any angle greater than 45° to the line of sight. This is most useful, because it means that an observer need not stand directly in front of the glass in order to see through it. In the most preferred embodiments of the invention, the glass exhibits, over a said matted surface area, substantial isotropy, so that resolution through the matted surface area is substantially independent of the orientation of the glass. This is in marked contrast to the previously known matted glass produced commercially in accordance with the teaching of British patent specification No. 1 151 931.

Preferably, such piece of glass has a said matted surface area on opposite faces thereof. This renders reflections from both such faces of the piece of glass less perceptible.

A piece of glass may be matted in accordance with the invention by appropriate chemical treatment. The glass may be exposed to a chemical treatment medium in any convenient way. If it is desired to treat the whole surface of the piece of glass, then it may be most convenient to treat it by dipping into a bath of treatment medium. If on the other hand it is desired to treat only part of the glass surface, for example one face of a glass sheet, then the treatment can be performed by a spraying technique, or by a dipping technique after a mask has been applied to that part of the surface which it is desired not to treat.

This invention extends to a process of producing matted glass, and there is accordingly provided a process of producing matted glass comprising forming a surface area of a piece of glass with a population of surface pits, characterised in that such surface area is etched with a solution of a salt of hydrofluoric acid leaving a substantially contiguous population of fluorine-containing crystals, in that such crystals are removed to leave such surface area with a population of merging or contiguous surface pits, and in that the resulting pitted surface area is treated to remove a superficial stratum therefrom, whereby said surface area is left occupied by a population of merging or contiguous surface pits which are of such small size that a disk having a diameter of 10 μm cannot be placed thereon without overlapping at least two pits.

Such a process is especially valuable and convenient for forming a piece of matted glass in accordance with this invention. It is found that treatment with a salt of hydrofluoric acid can easily be arranged to give a required population density of surface pits which are occupied by fluorine-containing crystals due to the reaction between the salt solution and the glass. When these crystals are removed, most easily by washing, the pits are of polyhedral or angular form, reflecting the shape of the fluorine-containing crystals formed, and on the subsequent removal of a superficial stratum from the pitted surface area, it is very easy to ensure that their profiles are smoothed.

In the most preferred embodiments of the invention, said solution of a salt of hydrofluoric acid is an aqueous solution of one or more of potassium bifluoride, sodium bifluoride and ammonium bifluoride. The use of such a bifluoride promotes a chemical attack on the glass which is such as to leave, after removal of the fluorosilicate crystals formed, a pitted surface of a form which is particularly convenient for subsequent superficial stratum removal to leave a matted surface area. The use of an alkali metal bifluoride ensures that attack on the glass will be substantially independent of the alkali metal content of the glass. The use of a solution of a salt of hydrofluoric acid which substantially consists of potassium bifluoride in water is particularly recommended.

Advantageously, said solution of a salt of hydrofluoric acid is an aqueous solution containing said salt in a proportion of from 70 to 200 grams per liter, and said surface area is exposed to such solution for a time of from 20 seconds to 2 minutes. This promotes the formation of a multiplicity of small fluorine-containing crystals which can be removed to leave a very dense population of small surface pits in the glass.

The removal of the said superficial stratum from the glass after the formation of pits therein may be effected by a mechanical polishing treatment, but it is more convenient, and generally easier to achieve a more uniform treatment if, as is preferred, said superficial stratum removal is effected in a chemical polishing step.

Advantageously, said chemical polishing is effected by exposing said surface area to a solution comprising hydrofluoric acid. Such a treatment is quite simple to perform to impart the required profile to the surface pits to leave a matted surface area on the glass through which can be observed a clear image of an object placed some distance away.

It is especially convenient to effect said chemical polishing by exposing said surface area for a time of from 60 minutes to 20 seconds to a solution comprising from 1.0% to 20% hydrofluoric acid and 0% to 15% sulphuric acid, by volume.

Preferably, such superficial stratum removal is such as to round the profile of at least the bottom portions of said pits. This is found to promote resolvability through the matted glass.

In some preferred embodiment of the invention, such etching step is preceded by an initial acid-washing step in which the surface area to be matted is washed with an acid solution. This is found to give a virgin surface which consequently allows a more uniform etching and results in a more uniformly treated product.

It is particularly convenient to effect said initial acid-washing in the same way as said chemical polishing, namely by exposing said surface area for a time of from 60 minutes to 20 seconds to a solution comprising from 1.0% to 20% hydrofluoric acid and 0% to 15% sulphuric acid.

In some preferred embodiments of the invention, such etching step is preceded by a step in which the surface area to be matted is coated with a viscous film of organic material. This is found to have the effect of reducing the size of the pits which will be formed in the surface of the glass during the etching step, resulting in enhanced resolvability through the matted surface area. Among suitable organic materials may be cited one or more of: sucrose, glucose, glycerine, glycol and polyvinyl pyrrolidone.

In fact we have found that the initial acid-washing step referred to above tends to result in the formation of larger crystals and thus larger pits during the etching step. We have found that it is possible to combine various successive treatment steps in such a way as to give some measure of control over the size of the crystals which will be formed during the etching step, and it is most preferred that said initial acid-washing step precedes such organic coating step.

If it is desired to enhance the resistance of the matted glass to breakage, the glass may be chemically tempered after the final matting treatment without impairing its optical properties.

A dealkalising treatment may be performed on the glass after etching if this is desired.

BRIEF DESCRIPTION OF THE DRAWING

Preferred embodiments of the present invention will now be described by way of example and with reference to the accompanying drawings in which FIG. 5 is a graph showing luminous transmittance and reflectance curves for the treated glass shown in FIG. 4.

DESCRIPTION OF THE PREFERRED EMBODIMENTS

Example 1

Figure 1:
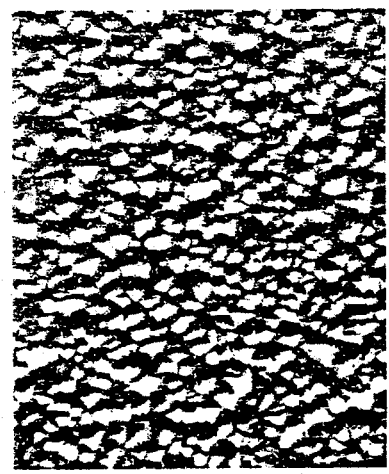
FIGS. 1 and 2 are each an electron-micrograph of a sheet of glass which has been subjected to part of a treatment in accordance with this invention.

A sheet of drawn soda-lime glass 1.9 mm thick was dipped in an aqueous solution containing between 70 and 150 g/L potassium bifluoride in an etching bath at ambient temperature (approximately 20 C) for a period of about 1 minute. A layer of crystals of potassium fluorosilicate was formed on the immersed surfaces of the glass, and these were removed by washing in water. The resulting surface was found to be populated by a multiplicity of contiguous polyhedral surface pits each having a maximum dimension of between about 5 $\mu$m and about 1 $\mu$m, and a depth of the order of 0.4 $\mu$m. An electron-micrograph of that surface to a scale as marked of approximately 1000 times magnification is shown as FIG. 1. The glass whose surface was so treated exhibited excellent light diffusing properties, but resolution through the glass of an object placed a few centimeters behind it was impossible. The total luminous transmittance of the thus treated sheet was about 88%, and the diffuse transmittance was about 60% of normally incident light.

In this specification, "luminous transmittance" denotes the ratio of transmitted to incident light in accordance with ASTM Method D 307 (1964 Book of ASTM Standards, Part 21). "Diffuse" used in relation to light transmission denotes that proportion of light which in passing through glass is caused to deviate from the incident beam by scattering through more than 2.5°. "Diffuse" used in relation to light reflection denotes that proportion of light which on reflection at a glass/air interface is caused to deviate from the specularly reflected beam by scattering through the more than 2.5°.

Figure 2:
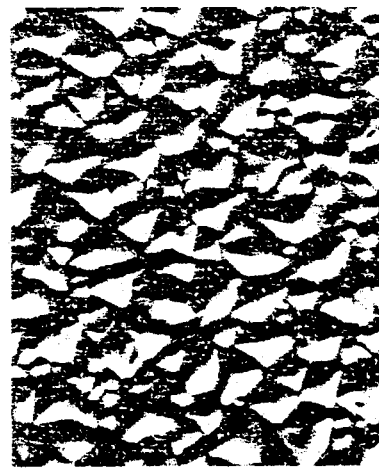

In order to vary the size of the pits formed, and to achieve a more uniform pit size, this etching step is preceded by a polishing step in which the glass is washed with an initial acid-washing solution containing by volume 1% hydrofluoric acid and 6% sulphuric acid in water, for several minutes at ambient temperature. After rinsing in water, the glass is subjected to the same etching treatment and then washed in water. An electron-micrograph of the resulting surface to a scale as marked of approximately 1000 times magnification is shown as FIG. 2. The resulting surface pits were again polyhedral and had a maximum dimension ranging between 7 $\mu$m and 10 $\mu$m having a depth of up to 0.8 $\mu$m, with a scattering of much smaller pits. The total luminous transmittance of the thus treated sheet was increased to about 93% and the proportion of normally incident light which was transmitted diffusely was increased to slightly more than 75%. Again, resolution through the glass of an object placed a few centimeters behind it was impossible.

Figure 3:
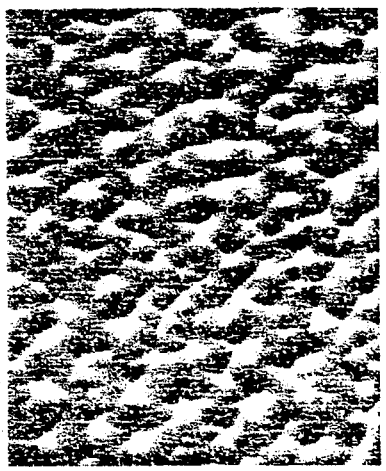
FIGS. 3 and 4 are each an electron-micrograph of a sheet of glass which has been treated in accordance with this invention.

This acid-washed and etched sheet of glass was then subjected to a treatment in which a superficial stratum was removed. This latter treatment consisted of immersing the sheet in a polishing bath containing by volume 1% hydrofluoric acid and 6% sulphuric acid in water for one hour at ambient temperature. An electron-micrograph of the resulting surface to a scale as marked of approximately 1000 times magnification is shown as FIG. 3. The resulting surface pits are of rounded profile with a depth of up to 0.8 $\mu$m and with a maximum dimension generally less than 10 $\mu$m. It is not possible to place a 10 mm disk (10 $\mu$m×1000) on FIG. 3 without overlapping at least two of the pits. The total luminuous transmittance of the thus treated sheet was about 92% and the proportion of normally incident light which was transmitted diffusely was about 38.5%. The proportion of normally incident light which was reflected diffusely was more than 90% of the total amount reflected. The angle of scatter of the light which was transmitted diffusely at the matted surface of the glass was more than 10°.

It was found that the ordinary typescript in characters of 10-pitch size could easily be read through the resulting matted glass when the typescript was held 60 cm away from the eye, no matter where the glass was held between the eye and the typescript, provided only that the glass was oriented at an angle of more than 10° to the line of sight.

Example 2

Figure 4:
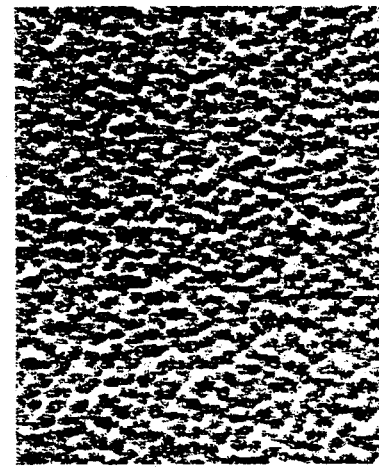

A sheet of drawn soda-lime glass 1.5 mm thick was subjected to the same initial acid-washing treatment as in Example 1. After this initial acid-washing treatment, the glass was rinsed and dipped in a bath containing glycerine and water to leave a film of glycerine on the surface of the glass. The glycerine-coated glass was then dipped in an etching bath containing an aqueous solution of potassium bifluoride (between 70 and 120 g/L) at ambient temperature (approximately 20 C.) for a period of between 30 and 60 seconds. The glass was removed and rinsed in water and was then immersed in a chemical polishing bath containing 10% hydrofluoric acid and 4% sulphuric acid (aqueous) for 2 minutes at ambient temperature, and then again rinsed. An electron-micrograph of the resulting surface to a scale as marked of approximately 1000 times magnification is shown as FIG. 4. This shows a dense population of surface pits which have a rounded profile with a maximum dimension of less than 5 $\mu$m and a depth of the order of 0.4 $\mu$m. It is not possible to place a 5 mm disk (5 μm×1000) on FIG. 4 without overlapping at least two of the pits.

The graph of FIG. 5 shows, as a percentage of normally incident light:

at TT, the total luminous transmittance for various wavelengths at TD, the diffuse transmittance for those wavelengths at RT, the total light reflectance for those wavelengths, and at RD, the diffuse light reflectance for those wavelengths.

It will be noted that the proportion of transmitted light which is diffuse decreases with increasing wavelength over the visible range.

The matted sheet has the following optical properties integrated over the visible spectrum:

| Total transmission | 89.48% of normally incident light |
|---|---|
| Diffuse transmission | 45.61% of normally incident light |
| | 50.97% of transmitted light |
| Total reflectance | 7.96% of normally incident light |
| Diffuse reflectance | 7.58% of normally incident light |
| | 95.23% of reflected light |

It will be noted that the total reflectance is very little different from what would be expected with an untreated sheet, but that whereas with the untreated sheet, substantially all reflected light would be specularly reflected, less than 5% of the total reflected light is specularly reflected by the sheet treated in accordance with this Example. The angle of scatter of the light which was transmitted diffusely at the matted surface of the glass was more than 10°.

It was found that an object located up to several meters behind the glass could be viewed through the glass with substantially no loss in image resolution.

Example 3

A sheet of drawn soda-lime glass 1.04 mm thick was subjected to initial acid-washing, glycerine-coating and rinsing treatments as described in Example 2, and was then etched for less than 1 minute at ambient temperature in a bath containing an aqueous solution of potassium bifluoride (between 150 and 200 g/L). The glass was removed and rinsed in water and was then immersed in a chemical polishing bath containing by volume 10% hydrofluoric acid and 5% sulphuric acid (aqueous) for 3 minutes at ambient temperature, and then again rinsed. The surface structure of the sheet was very similar to that shown in FIG. 4. The thus treated sheet had a very high total luminous transmittance calculated as 93.40%, and a diffuse transmittance of 40.97% of normally incident visible light. The angle of scatter of the light which was transmitted diffusely at the matted surface of the glass was more than 10°.

It was again found that an object located up to several meters behind the glass could be viewed through the glass with substantially no loss in image resolution.

In a variant of any of the foregoing Examples, the etching step is performed using sodium bifluoride or ammonium bifluoride instead of potassium bifluoride. This gives very similar results.

In another variant, the treated glass is subsequently chemically tempered to increase its resistance to mechanical shock. This makes no appreciable difference to the optical properties of the glass.

A piece of matted glass in accordance with the invention is useful in any circumstance where known matted glass could be used, except where such known matted glass is used in order specifically to prevent through vision. Examples of uses of appropriately shaped pieces of matted glass in accordance with this invention are as "anti-reflection" screens in picture frames or in diapositive holders for reducing objectionable effects, for example interference effects, due to specular reflection at the sheet surface. Such glass may also be used where previously known matted glass would be unsuitable because of the distance between the sheet and an object to be protected thereby. For example a matted sheet in accordance with the invention may be used for facing a display cabinet. Other examples of uses for pieces of matted glass in accordance with this invention are as cathode ray tube screens, as instrument dial glasses including watch glasses, and as liquid crystal display or light emitting diode display screens.

Matted glass in accordance with the invention is also of particular benefit for use in photo-voltaic cells, especially those of the amorphous silicon type. In such a cell, a sheet of glass which has been matted on one or both sides may be coated with successive layers of doped tin oxide, amorphous silicon and a reflective conductor such as aluminium. Diffused light penetrating the silicon layer follows a path of increased length, thus increasing the yield of electron-hole pairs without increasing the thickness of the silicon layer and thus without increasing the probability that a just released electron will be trapped before it can migrate to a conductive layer. For a given incident light intensity, therefore the conversion yield of the cell is increased compared with one incorporating untreated glass.

What is claimed is:

1. A piece of light transmitting glass, comprising: a flat sheet of glass having at least one surface area which is matted by surface pits and which has a population of merging or contiguous surface pits, the pits being of such a small area and and having bottom portions having a rounded profile so that clearly legible typed characters of 10-pitch size are still clearly legible when viewed through such matted surface area when that surface is held at a distance of 10 cm from the said characters.

2. A piece of glass according to claim 1, wherein at least one said matted surface area is occupied by a said population of surface pits which are of such small size that a disk having a diameter of 10 μm cannot be placed thereon without overlapping at least two pits.

3. A piece of glass according to claim 2, wherein at least one said matted surface area is occupied by a said population of surface pits which are of such small size that a disk having a diameter of 5 μm cannot be placed thereon without overlapping at least two pits.

4. A piece of glass according to claim 1, wherein at least one said matted surface area is occupied by a said population of surface pits, substantially all of which pits have a depth in the range 0.1 μm to 1.0 μm inclusive.

5. A piece of glass according to claim 1, wherein at least one said matted surface area is occupied by a said population of surface pits, substantially all of which pits have a depth and mean transverse dimension (hereinafter called "diameter") which are so related that the depth of a said pit divided by its diameter is at least 0.01.

6. A piece of glass according to claim 5, wherein at least one said matted surface area is occupied by a dense population of surface pits, substantially all of which pits have a depth and diameter which are so related that the depth of a said pit divided by its diameter lies between 0.02 and 0.5 inclusive.

7. A piece of glass according to claim 1, wherein the angle of scatter of diffuse light transmitted by such matted surface area is at least 10°.

8. A piece of glass according to claim 1, wherein at least 30% of the light which is transmitted through the glass over such matted surface area is transmitted diffusely.

9. A piece of glass according to claim 1, wherein at least 70% of the light which is reflected at such matted surface area is reflected diffusely.

10. A piece of glass according to claim 1, wherein said typed characters are clearly legible when viewed through such matted surface area when the flat glass surface is held at a distance of 20 cm from the said characters.

11. A piece of glass according to claim 1, wherein provided said characters are located at a distance from the eye of a reader at which those characters can be read clearly, the characters are clearly legible through said matted surface area of said piece of flat glass no matter where the glass is located between the characters and the reader's eye.

12. A piece of glass according to claim 1, wherein said characters are clearly legible when viewed through said matted surface area of said piece of flat glass when the glass is at any angle greater than 45° to the line of sight.

13. A piece of glass according to claim 1, wherein such piece of glass has a said matted surface area on opposite faces thereof.

14. A piece of light transmitting glass, comprising:
glass which is not a flat sheet, and which has at least one surface area which is matted by surface pits and which has a population of merging or contiguous surface pits, the pits being of such small area and having bottom portions having a rounded profile so that clearly legible typed characters of 10-pitch size would still be clearly legible when viewed through an identically pitted surface area of a sheet of light transmitting flat glass when such surface of such flat glass sheet is held at a distance of 10 cm from the said characters.

* * * * *